(12) United States Patent
Metius et al.

(10) Patent No.: US 9,028,585 B2
(45) Date of Patent: *May 12, 2015

(54) SYSTEM AND METHOD FOR REDUCING IRON OXIDE TO METALLIC IRON USING COKE OVEN GAS AND OXYGEN STEELMAKING FURNACE GAS

(71) Applicants: Gary E. Metius, Charlotte, NC (US); James M. McClelland, Jr., Cornelius, NC (US); David C. Meissner, Charlotte, NC (US); Stephen C. Montague, Charlotte, NC (US)

(72) Inventors: Gary E. Metius, Charlotte, NC (US); James M. McClelland, Jr., Cornelius, NC (US); David C. Meissner, Charlotte, NC (US); Stephen C. Montague, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/955,654

(22) Filed: Jul. 31, 2013

(65) Prior Publication Data
US 2013/0312571 A1    Nov. 28, 2013

Related U.S. Application Data

(63) Continuation-in-part of application No. 13/363,044, filed on Jan. 31, 2012, now Pat. No. 8,685,136, and a continuation-in-part of application No. 13/107,013, filed on May 13, 2011, now Pat. No. 8,496,730.

(60) Provisional application No. 61/334,786, filed on May 14, 2010.

(51) Int. Cl.
    *C21B 11/02*      (2006.01)
    *C21B 13/02*      (2006.01)

(52) U.S. Cl.
CPC ............... *C21B 11/02* (2013.01); *C21B 13/02* (2013.01); *C21B 2100/02* (2013.01); *C21B 2100/04* (2013.01); *C21B 2100/06* (2013.01); *C01B 2203/025* (2013.01)

(58) Field of Classification Search
CPC   C22B 11/02; C22B 2100/02; C22B 2100/04; C22B 2100/06
See application file for complete search history.

(56) References Cited

U.S. PATENT DOCUMENTS

| | | | | |
|---|---|---|---|---|
| 3,905,201 A | * | 9/1975 | Coveney et al. | 62/646 |
| 4,041,130 A | * | 8/1977 | Mackles | 423/220 |
| 4,365,789 A | | 12/1982 | Scarlett et al. | |
| 4,591,380 A | * | 5/1986 | Summers et al. | 75/496 |
| 4,793,856 A | | 12/1988 | Price-Falcon et al. | |

(Continued)

OTHER PUBLICATIONS

Peter Diemer, Klaus Knop, Hans Bodo Lungen, Martin Reinke, Carl-Dieter Wuppermann; "Utilization of Coke Oven Gas for the Production of DRI" (Technik+Trends—Metallurgic); Stahl and Eisen 127 (2007) Nr. 1; Paper presented at STAHL 2006 Conference on Nov. 9, 2006 in Dusseldorf.

*Primary Examiner* — George Wyszomierski
*Assistant Examiner* — Tima M McGuthry Banks
(74) *Attorney, Agent, or Firm* — Clements Bernard PLLC; Christopher L. Bernard; Lawrence A. Baratta, Jr.

(57) ABSTRACT

Novel systems and methods are described for reducing iron oxide to metallic iron in an integrated steel mill or the like that has a coke oven and/or an oxygen steelmaking furnace. More specifically, the present invention relates to novel systems and methods for reducing iron oxide to metallic iron using coke oven gas (COG) or COG and basic oxygen furnace gas (BOFG).

37 Claims, 7 Drawing Sheets

(56) References Cited

U.S. PATENT DOCUMENTS

| | | | |
|---|---|---|---|
| 4,822,411 A * | 4/1989 | Standler et al. | 75/496 |
| 4,889,323 A | 12/1989 | Pusch et al. | |
| 5,997,596 A * | 12/1999 | Joshi et al. | 48/198.1 |
| 6,027,545 A | 2/2000 | Villarreal-Trevino | |
| 6,328,946 B1 | 12/2001 | Stephens, Jr. | |
| 6,986,800 B2 | 1/2006 | Duarte-Escareno et al. | |
| 8,496,730 B2 * | 7/2013 | Metius et al. | 75/489 |
| 2004/0226406 A1 | 11/2004 | Duarte-Escareno et al. | |
| 2009/0211401 A1 | 8/2009 | Zendejas-Martinez et al. | |

* cited by examiner

US 9,028,585 B2

SYSTEM AND METHOD FOR REDUCING IRON OXIDE TO METALLIC IRON USING COKE OVEN GAS AND OXYGEN STEELMAKING FURNACE GAS

CROSS-REFERENCE TO RELATED APPLICATION(S)

The present patent application/patent is a continuation-in-part of U.S. patent application Ser. No. 13/363,044 now U.S. Pat. No. 8,685,136), filed on Jan. 31, 2012, and entitled "SYSTEM AND METHOD FOR REDUCING IRON OXIDE TO METALLIC IRON USING COKE OVEN GAS AND OXYGEN STEELMAKING FURNACE GAS," which is a continuation-in-part of U.S. patent application Ser. No. 13/107,013 (now U.S. Pat. No. 8,496,730), filed on May 13, 2011, and entitled "SYSTEM AND METHOD FOR REDUCING IRON OXIDE TO METALLIC IRON USING COKE OVEN GAS AND OXYGEN STEELMAKING FURNACE GAS," which claims the benefit of priority of U.S. Provisional Pat. Application No. 61/334,786, filed on May 14, 2010, and entitled "SYSTEM AND METHOD FOR REDUCING IRON OXIDE TO METALLIC IRON USING COKE OVEN GAS AND OXYGEN STEELMAKING FURNACE GAS," the contents of all of which are incorporated in full by reference herein.

FIELD OF THE INVENTION

The present invention relates generally to a novel system and method for reducing iron oxide to metallic iron in an integrated steel mill or the like that has a coke oven and/or an oxygen steelmaking furnace. More specifically, the present invention relates to a novel system and method for reducing iron oxide to metallic iron using coke oven gas and/or oxygen steelmaking furnace gas.

BACKGROUND OF THE INVENTION

Integrated steel mills and the like typically have coke ovens and/or oxygen steelmaking furnaces and use excess associated gases for heating and power generation. In many applications, it would be desirable to use the associated coke oven gas (COG) and/or the associated basic oxygen furnace gas (BOFG) to reduce iron oxide to metallic iron, in the form of direct reduced iron (DRI), hot direct reduced iron (HDRI), or hot briquetted iron (HBI). Both COG and BOFG contain significant percentages of carbon monoxide (CO) and hydrogen ($H_2$), which are the primary reductants for reducing iron oxide to metallic iron. The COG also contains 20+% methane ($CH_4$), which, under the proper conditions, may be reformed with carbon dioxide ($CO_2$) and water ($H_2O$) to form CO and $H_2$. BOFG may contain up to 20% nitrogen ($N_2$), which may build up to very high levels in a recirculating system, for example.

BRIEF SUMMARY OF THE INVENTION

In various exemplary embodiments, the present invention provides an economical process for the direct reduction of iron ore when the external source of reductants is one or both of COG and BOFG, the latter also known as oxygen steelmaking furnace gas. $CO_2$ is removed from a mixture of shaft furnace off gas, obtained from a conventional direct reduction shaft furnace, well known to those of ordinary skill in the art, and BOFG. This $CO_2$ lean gas is then mixed with clean COG, humidified, and heated in an indirect heater. Oxygen ($O_2$) is then injected into the heated reducing gas to further increase its temperature. This hot reducing gas flows to the direct reduction shaft furnace, where $CH_4$ in the hot reducing gas undergoes reforming by contact with the DRI/HDRI, followed by reduction of the iron oxide. The spent hot reducing gas exits the direct reduction shaft furnace as shaft furnace off gas, produces steam in a waste heat boiler, is cleaned in a cooler scrubber, and is compressed and recycled to join fresh BOFG. A portion of the shaft furnace off gas is sent to the heater burners.

Other contemplated uses for the BOFG include as a supplement to the cleaned/cooled shaft furnace off gas for use as the top gas fuel for the indirect heater. Similarly, the COG may be used for a variety of other purposes as well. The COG that is heated in the indirect heater is preferably first cleaned of complex hydrocarbons that would foul the indirect heater via oxidation processing (i.e. partial combustion) or the like (thereby correspondingly reducing, and potentially eliminating, the need for BOFG supplementation). COG with or without the complex hydrocarbons may also be used to supplement the top gas fuel for the indirect heater, as direct reduction shaft furnace transition zone injection gas, and/or to enrich the ultimate reducing gas stream. All of these possibilities, which are not mutually exclusive and may be used in any combination, are described in greater detail herein below.

One object of the present invention is to maximize the amount of DRI, HDRI, or HBI that may be produced from a given quantity of COG and/or BOFG.

Another object of the present invention is to provide an efficient process given varying quantities of COG and/or BOFG.

A further object of the present invention is to minimize equipment, and hence, plant cost by eliminating an external catalytic reformer, which would be used to generate CO and $H_2$ by reforming $CH_4$ in the COG with oxidants from the shaft furnace off gas and BOFG. Heating the mixture of $CO_2$ lean gas, $CO_2$ lean BOFG, and COG in an indirect heater followed by $O_2$ injection and reforming in the direct reduction shaft furnace is less expensive than the use of the external catalytic reformer.

A still further object of the present invention is to allow the operation of the direct reduction shaft furnace at a lower pressure than would otherwise be allowable, as the $CH_4$ level in the hot reducing gas delivered to the direct reduction shaft furnace is lowered by adding the BOFG.

A still further object of the present invention is to limit the buildup of $N_2$ to an acceptable level by utilizing a portion of the spent hot reducing gas as indirect heater fuel.

In one exemplary embodiment, the present invention provides a novel system for reducing iron oxide to metallic iron using coke oven gas (COG) and oxygen steelmaking furnace gas (BOFG), including: a direct reduction shaft furnace for providing off gas; a BOFG source for providing BOFG; a carbon dioxide ($CO_2$) removal system for removing $CO_2$ from a mixture of the off gas and the BOFG; a COG source for mixing a resulting $CO_2$ lean gas with COG; and the direct reduction shaft furnace reducing iron oxide to metallic iron using a resulting reducing gas. The system also includes a saturator for adjusting the moisture content of the resulting reducing gas prior to it being used in the direct reduction shaft furnace. The system further includes an indirect heater for heating the resulting reducing gas prior to it being used in the direct reduction shaft furnace. Optionally, a fuel gas for the indirect heater comprises a portion of the off gas and a portion of one or more of the COG and the BOFG. The system still further includes an oxygen source for adding oxygen to the resulting reducing gas prior to it being used in the direct reduction shaft furnace. Optionally, the system still further includes a conduit for communicating a portion of the COG from the COG source to the resulting reducing gas prior to it being used in the direct reduction shaft furnace. Optionally, the system still further includes a conduit for communicating a portion of the COG from the COG source to a transition zone of the direct reduction shaft furnace. Optionally, the system still further includes a partial oxidation reactor for removing complex hydrocarbons from the COG prior to it being mixed with the $CO_2$ lean gas. Preferably, an amount of the BOFG used is dependent upon an amount and composition of the COG used.

In another exemplary embodiment, the present invention provides a novel method for reducing iron oxide to metallic iron using coke oven gas (COG) and oxygen steelmaking furnace gas (BOFG), including: obtaining off gas from a direct reduction shaft furnace; obtaining BOFG from a BOFG source; removing carbon dioxide ($CO_2$) from a mixture of the off gas and the BOFG; mixing a resulting $CO_2$ lean gas with COG from a COG source; and reducing iron oxide to metallic iron in the direct reduction shaft furnace using a resulting reducing gas. The method also includes adjusting the moisture content of the resulting reducing gas using a saturator prior to it being used in the direct reduction shaft furnace. The method further includes heating the resulting reducing gas using an indirect heater prior to it being used in the direct reduction shaft furnace. Optionally, a fuel gas for the indirect heater comprises a portion of the off gas and a portion of one or more of the COG and the BOFG. The method still further includes adding oxygen to the resulting reducing gas using an oxygen source prior to it being used in the direct reduction shaft furnace. Optionally, the method still further includes communicating a portion of the COG from the COG source to the resulting reducing gas using a conduit prior to it being used in the direct reduction shaft furnace. Optionally, the method still further includes communicating a portion of the COG from the COG source to a transition zone of the direct reduction shaft furnace using a conduit. Optionally, the method still further includes removing complex hydrocarbons from the COG prior to it being mixed with the $CO_2$ lean gas using a partial oxidation reactor. Preferably, an amount of the BOFG used is dependent upon an amount and composition of the COG used.

In a further exemplary embodiment, the present invention provides a method for reducing iron oxide to metallic iron, including: obtaining off gas from a direct reduction shaft furnace; obtaining basic oxygen furnace gas (BOFG) from a BOFG source; removing carbon dioxide ($CO_2$) from a mixture of the off gas and the BOFG; and reducing iron oxide to metallic iron in the direct reduction shaft furnace using a resulting $CO_2$ lean gas. Optionally, the method also includes mixing the resulting $CO_2$ lean gas with coke oven gas (COG) from a COG source prior to using it as a reducing gas. Optionally, the method further includes removing complex hydrocarbons from the COG prior to it being mixed with the resulting $CO_2$ lean gas.

In a still further exemplary embodiment, the present invention provides a method for reducing iron oxide to metallic iron, including: obtaining off gas from a direct reduction shaft furnace; mixing the off gas with coke oven gas (COG) from a COG source; and reducing iron oxide to metallic iron in the direct reduction shaft furnace using a resulting reducing gas. Optionally, the method also includes: obtaining basic oxygen furnace gas (BOFG) from a BOFG source; removing carbon dioxide ($CO_2$) from a mixture of the off gas and the BOFG; and mixing a resulting $CO_2$ lean gas with the COG from the COG source. Optionally, the method further includes removing complex hydrocarbons from the COG prior to it being mixed with the $CO_2$ lean gas.

In a still further exemplary embodiment, the present invention provides a system for reducing iron oxide to metallic iron using coke oven gas (COG), including: a direct reduction shaft furnace for providing off gas; a COG source for injecting COG into a reducing gas stream including at least a portion of the off gas; and the direct reduction shaft furnace reducing iron oxide to metallic iron using the reducing gas stream and injected COG. The COG has a temperature of about 1,200 degrees C. or greater upon injection. The COG has a $CH_4$ content of between about 2% and about 13%. Preferably, the COG is reformed COG. Optionally, the COG is fresh hot COG. The COG source includes a partial oxidation system. Optionally, the COG source includes a hot oxygen burner. Optionally, the system still further includes a basic oxygen furnace gas (BOFG) source for injecting BOFG into the off gas that forms at least a portion of the reducing gas stream. Optionally, the system still further includes a carbon dioxide ($CO_2$) removal system for removing $CO_2$ from the mixture of the off gas and the BOFG.

In a still further exemplary embodiment, the present invention provides a method for reducing iron oxide to metallic iron using coke oven gas (COG), including: providing a direct reduction shaft furnace for providing off gas; providing a COG source for injecting COG into a reducing gas stream including at least a portion of the off gas; and the direct reduction shaft furnace reducing iron oxide to metallic iron using the reducing gas stream and injected COG. The COG has a temperature of about 1,200 degrees C. or greater upon injection. The COG has a $CH_4$ content of between about 2% and about 13%. Preferably, the COG is reformed COG. Optionally, the COG is fresh hot COG. The COG source includes a partial oxidation system. Optionally, the COG source includes a hot oxygen burner. Optionally, the method still further includes providing a basic oxygen furnace gas (BOFG) source for injecting BOFG into the off gas that forms at least a portion of the reducing gas stream. Optionally, the method still further includes providing a carbon dioxide ($CO_2$) removal system for removing $CO_2$ from the mixture of the off gas and the BOFG.

In a still further exemplary embodiment, the present invention provides a method for reducing iron oxide to metallic iron using COG, comprising: providing a top gas stream from a direct reduction shaft furnace; reforming natural gas with the top gas stream in a reformer to form a reducing gas stream and providing the reducing gas stream to the direct reduction shaft furnace to reduce the iron oxide to the metallic iron; and providing a COG stream to the reformer as fuel. The method further comprises preheating the COG stream in a preheater prior to providing the COG stream to the reformer as fuel. The method further comprises providing a portion of the preheated COG stream to the direct reduction shaft furnace as one or more of bustle gas and transition zone gas. The method further comprises adding oxygen to the bustle gas. The method further comprises firing the preheater with a portion of the top gas stream. The method further comprises preheating the COG stream in the preheater using waste heat from the reformer. The method further comprises venting from the recycle gas system one or more of carbon dioxide and nitrogen through the preheater. The method further comprises venting one or more of carbon dioxide and nitrogen from the reformer. The use of COG results in reduced natural gas consumption in the DR process, allows for control of the carbon content of the resulting DRI, and allows for control of the temperature of the bed in the shaft furnace.

In a still further exemplary embodiment, the present invention provides a method for reducing iron oxide to metallic iron using COG, comprising: providing a top gas stream from a direct reduction shaft furnace; removing carbon dioxide from the top gas stream using a carbon dioxide removal unit; heating the top gas stream in a gas heater to form a reducing gas stream and providing the reducing gas stream to the direct reduction shaft furnace to reduce the iron oxide to the metallic iron; and adding a COG stream to the reducing gas stream as a synthesis gas stream. The method further comprises preheating the COG stream in a preheater prior to adding the COG stream to the reducing gas stream as the synthesis gas stream. The method further comprises reacting the preheated COG stream in a thermal reactor system to form the synthesis gas stream. The thermal reactor system comprises a hot oxygen burner and a nozzle that processes oxygen and a fuel. The oxygen is received from an air separation plant. The fuel comprises a portion of the top gas stream. The method further comprises providing a portion of the COG stream to the gas heater as fuel. The method further comprises firing the preheater with a portion of the top gas stream. The method further comprises providing a portion of the preheated COG stream to the direct reduction shaft furnace as one or more of bustle gas and transition zone gas. The method further comprises adding oxygen to the bustle gas. The method further comprises generating steam in a boiler using the top gas stream and utilizing the steam in the carbon dioxide removal unit. The method further comprises providing a portion of the top gas stream to the gas heater as fuel. The use of COG in the bustle gas and the transition zone gas allows for control of the carbon content of the resulting DRI, and allows for control of the temperature of the bed in the shaft furnace.

In a still further exemplary embodiment, the present invention provides a method for reducing iron oxide to metallic iron using COG, comprising: providing a top gas stream from a direct reduction shaft furnace; removing carbon dioxide from the top gas stream using a carbon dioxide removal unit to form a carbon dioxide lean gas stream; adding a COG synthesis gas stream to the carbon dioxide lean gas stream to form a combined gas stream; removing moisture from the combined gas stream using a saturator to form a moisture controlled combined gas stream; and heating the moisture controlled combined gas stream in a gas heater to form a reducing gas stream and providing the reducing gas stream to the direct reduction shaft furnace to reduce the iron oxide to the metallic iron. The method further comprises preheating a COG stream in a heat exchanger. The method further comprises reacting the preheated COG stream in a thermal reactor system to form the COG synthesis gas stream. The thermal reactor system comprises a hot oxygen burner and a nozzle that processes oxygen and a fuel. The oxygen is received from an air separation plant. The fuel comprises a portion of the top gas stream. The method further comprises cooling the preheated and reacted COG stream in a boiler and the heat exchanger to form the COG synthesis gas stream. The method further comprises providing a portion of the COG stream to the gas heater as fuel. The heat exchanger operates by cross-exchange with the heated COG synthesis gas stream. The method further comprises providing a portion of the preheated COG stream to the direct reduction shaft furnace as one or more of bustle gas and transition zone gas. The method further comprises generating steam in a first boiler using the top gas stream and utilizing the steam in the carbon dioxide removal unit. The method further comprises generating steam in a second boiler using the preheated and reacted COG stream and utilizing the steam in the carbon dioxide removal unit. The method further comprises providing a portion of the top gas stream to the gas heater as fuel. The method further comprises adding oxygen to the reducing gas stream. Again, the use of COG in the bustle gas and the transition zone gas allows for control of the carbon content of the resulting DRI, and allows for control of the temperature of the bed in the shaft furnace.

In a still further exemplary embodiment, the present invention provides a method for reducing iron oxide to metallic iron using COG or COG and BOFG, comprising: providing a COG or COG and BOFG stream; preheating the COG or COG and BOFG stream in a heat exchanger; reacting the preheated COG or COG and BOFG stream in a thermal reactor system to form a reducing gas stream; and providing the reducing gas stream to a direct reduction shaft furnace to reduce the iron oxide to the metallic iron. The thermal reactor system comprises a hot oxygen burner and a nozzle that processes oxygen and a fuel. The oxygen is received from an air separation plant. The fuel comprises a portion of a top gas stream derived from the direct reduction shaft furnace that is cooled in the heat exchanger and cleaned in a scrubber. The COG or COG and BOFG stream is preheated in the heat exchanger by cross-exchange with the top gas stream, for example. The method further comprises providing a portion of the preheated COG or COG and BOFG stream to the direct reduction shaft furnace as one or more of bustle gas and transition zone gas. The method further comprises utilizing a remaining portion of the cooled/scrubbed top gas stream in one or more of a power generation system and a steelmaking facility. Again, the use of COG in the bustle gas and the transition zone gas allows for control of the carbon content of the resulting DRI, and allows for control of the temperature of the bed in the shaft furnace.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Figure 1:
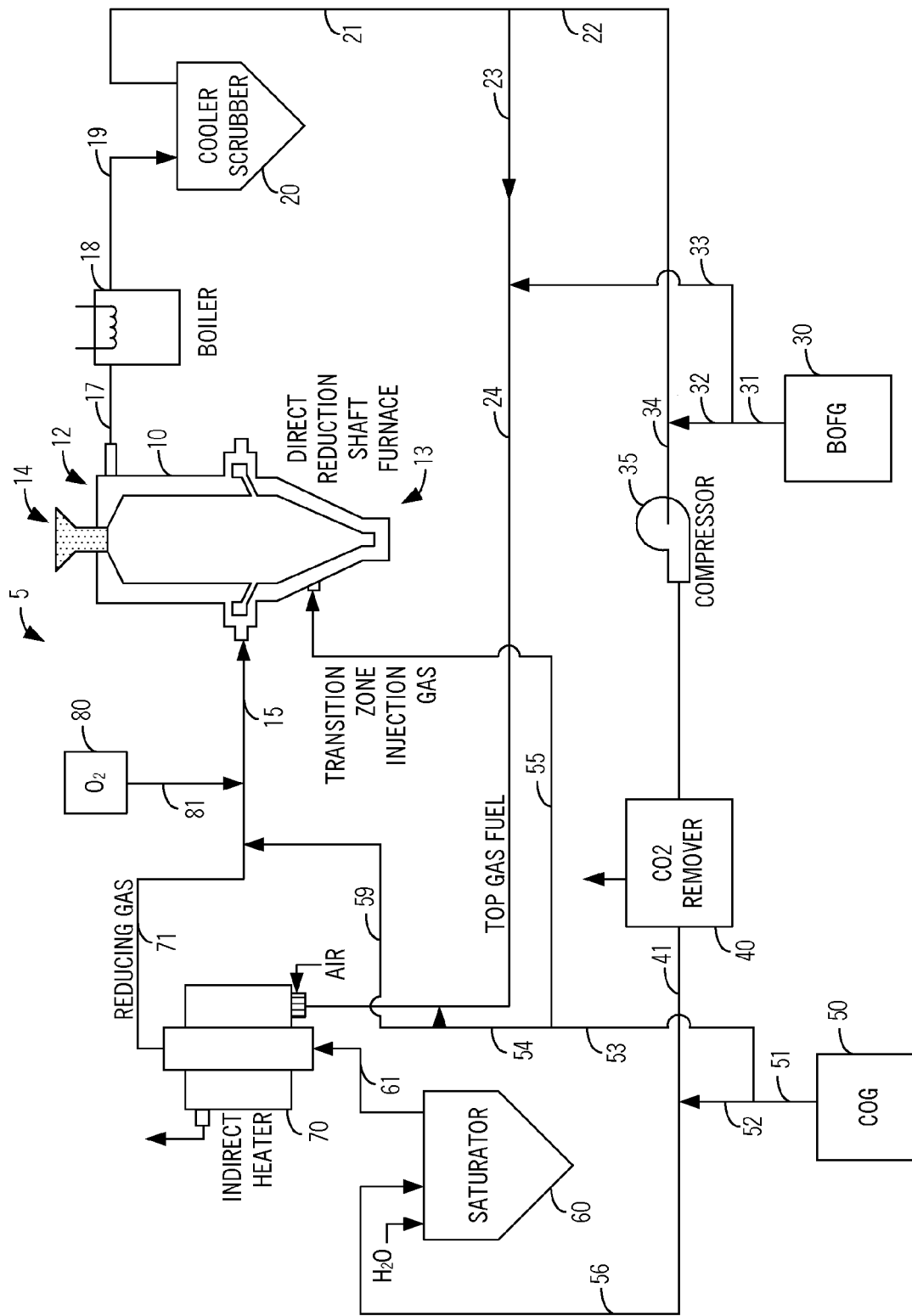
FIG. 1 is a schematic diagram illustrating one exemplary embodiment of the novel system and method for reducing iron oxide to metallic iron using COG and/or BOFG of the present invention.

Referring specifically to FIG. 1, in one exemplary embodiment, the novel system and method for reducing iron oxide to metallic iron using COG and/or BOFG (system and method, collectively 5) of the present invention includes individual components that are well known to those of ordinary skill in the art, and thus they are not illustrated or described in excessive detail herein, but that are combined together in an inventive process. These components include, but are not limited to, a conventional direct reduction shaft furnace 10, a waste heat boiler 18, a cooler scrubber 20, a BOFG source 30 (and/or appropriate storage vessel), a $CO_2$ removal system 40, a COG source 50 (and/or appropriate storage vessel), a saturator 60, an indirect heater 70, and an oxygen source 80 (and/or appropriate storage vessel).

The direct reduction shaft furnace 10 has an upper end where iron ore in the form of pellets, lumps, aggregates, etc. 14 is fed. The reduced pellets, lumps, aggregates, etc. 14 are removed at a lower end 13 of the direct reduction shaft furnace 10 as DRI. A reducing gas inlet conduit 15 is located between the feed charge and the product discharge, and supplies hot reducing gas to the direct reduction shaft furnace 10. This hot reducing gas contains $CH_4$, which is reformed near the gas inlet section of the direct reduction shaft furnace 10 by $CO_2$ and $H_2O$ contained in the hot reducing gas to produce additional CO and $H_2$. The HDRI acts as a catalyst in the reforming reaction. Following this reforming reaction, the hot reducing gas containing CO and $H_2$ reduces the iron oxide to metallic iron and exits the direct reduction shaft furnace 10 as spent reducing gas through an offtake conduit at the top of the direct reduction shaft furnace 10 flowing into a duct 17 to the waste heat boiler 18, and then to the cooler scrubber 20. The steam generated in the waste heat boiler 18 provides the majority of the regeneration heat for the $CO_2$ removal system 40, for example. The cooler scrubber 20 cools and cleans the spent off gas, which exits the cooler scrubber through a conduit 21.

Next, a portion of the cooled off gas enters another conduit 23 and flows to the burners of the indirect heater 70. A portion of the cooled off gas also enters a further conduit 22 and joins a conduit 32 from the BOFG source 30, forming another conduit 34 that flows to a compressor 35. The compressed gas from the compressor 35 flows to the $CO_2$ removal system 40, where $CO_2$ is scrubbed from the gas. The $CO_2$ lean gas in the conduit 41 is then enhanced by COG from another conduit 52, and then enters a further conduit 56, which flows to the saturator 60 where $H_2O$ is added to the gas in order to adjust it for carbon control in the direct reduction shaft furnace 10.

Additional BOFG is combined directly with the top gas fuel stream through a conduit 33. Additional COG is sent to the auxiliary burners of the indirect heater 70 through one or more conduits 53 and 54 and to the transition zone of the direct reduction shaft furnace 10, as transition zone injection gas, through one or more other conduits 53 and 55. The gas from the saturator 60 flows through a conduit 61 to the indirect heater 70, where the gas is heated to near reduction temperature by the burners fueled by the combination of spent direct reduction furnace off gas and BOFG, as well as the auxiliary burners fueled by COG, for example.

Combustion air is preheated by heat exchange with heater flue gas. The hot gas from the indirect heater 70 leaves through a conduit 71 and $O_2$ from the oxygen source 80 is added via another conduit 81 to raise the temperature of the gas to 1000 degrees C. or higher. The gas then flows through a further conduit 15, with the elevated temperature required to supply the endothermic load necessary for the in situ reforming in the reduction shaft furnace 10.

In general, COG and BOFG have analyses that may vary depending on the particular raw materials and specific practices at various steel mills throughout the world. The table below provides some non-limiting examples:

|  | COG | BOFG |
| --- | --- | --- |
| CO | 6-7 | 55-72 |
| $CO_2$ | 1-2 | 13-18 |
| $H_2$ | 61-63 | 1-4 |
| $H_2O$ | 1-5 | 1-5 |
| $CH_4$ | 21-24 | 1-3 |
| $N_2$ | 3-7 | 11-20 |

If the COG and BOFG are utilized in the most efficient manner to produce DRI/HDRI/HBI with a minimum amount of COG and/or BOFG without export fuel, there is a specific ratio of COG to BOFG for each analysis of the gases. This ratio may vary from about 0.95 to about 1.25. For BOFG with higher amounts of CO, and consequently lower amounts of $N_2$, the ratio is closer to 0.95. For BOFG with higher amounts of $N_2$, and consequently lower amounts of CO, more COG is required and the ratio is closer to 1.25.

As mentioned above, it is possible to run varying ratios of COG to BOFG outside of the calculated best operating point, but it must be done with export fuel that would have to be consumed elsewhere. One such use of this export fuel could be to raise additional steam for regeneration in the $CO_2$ removal system 40, for example.

As described above, in addition to supplementing the shaft furnace off gas stream and contributing to the eventual reducing gas stream, other contemplated uses for the BOFG include supplementing the shaft furnace off gas stream for use as the top gas fuel for the indirect heater 70 (via conduits 31, 33, and 24). Similarly, in addition to supplementing the shaft furnace off gas stream and contributing to the eventual reducing gas stream, the COG may be used for a variety of other purposes as well.

Figure 2:
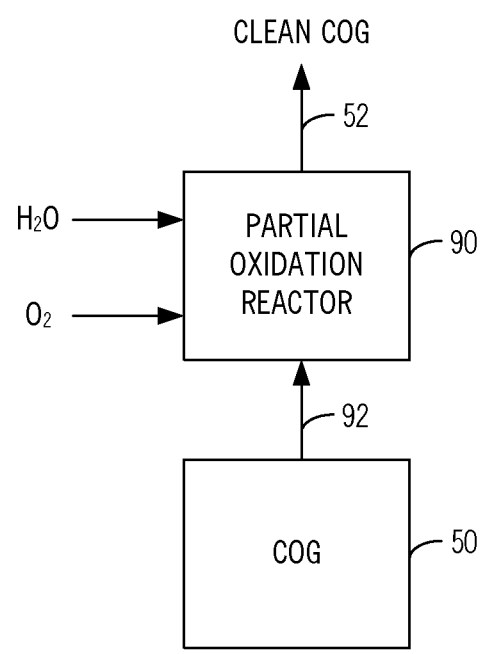
FIG. 2 is a schematic diagram illustrating one exemplary embodiment of a process for removing complex hydrocarbons from the COG in conjunction with the system and method of FIG. 1.

Referring specifically to FIG. 2, the COG from the COG source 50 that is eventually heated in the indirect heater 70 (FIG. 1) is preferably first cleaned of sulfur and complex hydrocarbons that would foul the indirect heater 70 via oxidation processing (i.e. partial combustion) or the like in a partial oxidation reactor 90 or the like, with the addition of $O_2$ and $H_2O$ (i.e. steam). This cleaning process correspondingly reduces, and potentially eliminates, the need for BOFG supplementation, if so desired. The cleaning process is primarily required to deal with the presence of quantities of $NH_3$, $H_2S$, Tars, HCN, Naphthalene, and BTX (Benzol, Toluene, and Xylene) in the COG. Optionally, the cleaning process takes place as a lesser reaction in the ducts of the reducing gas system, as opposed to the partial oxidation reactor 90.

The oxidation reaction looks as follows (exemplary only):
COG –7.5% CO, 3.5% $CO_2$, 54% $H_2$, 25.25% $CH_4$, 7.45% $N_2$, 2.3% Calm
1 Part Steam to 10 Parts COG
Oxygen Addition for 10 Parts COG:
1.7 Parts Oxygen:
21.38% CO, 2.8% $CO_2$, 61.16% $H_2$, 7.28% $H_2O$, 2.91% $CH_4$, 4.46% N2
Temp. 800 degrees C., 17.1 Parts Product Gas
2 Parts Oxygen:
22.81% CO, 2.54% $CO_2$, 61.74% $H_2$, 8.14% $H_2O$, 0.49% $CH_4$, 4.27% N2
Temp. 880 degrees C., 17.9 Parts Product Gas Referring again specifically to FIG. 1, COG with or without the complex hydrocarbons may also be used to supplement the top gas fuel for the indirect heater 70 (via conduits 53 and 54), as direct reduction shaft furnace transition zone injection gas (via conduits 53 and 55), and/or to enrich the ultimate reducing gas stream (via conduits 53, 54, and 59). Each of these possibilities is not mutually exclusive and all of these possibilities may be used in any combination.

Figure 3:
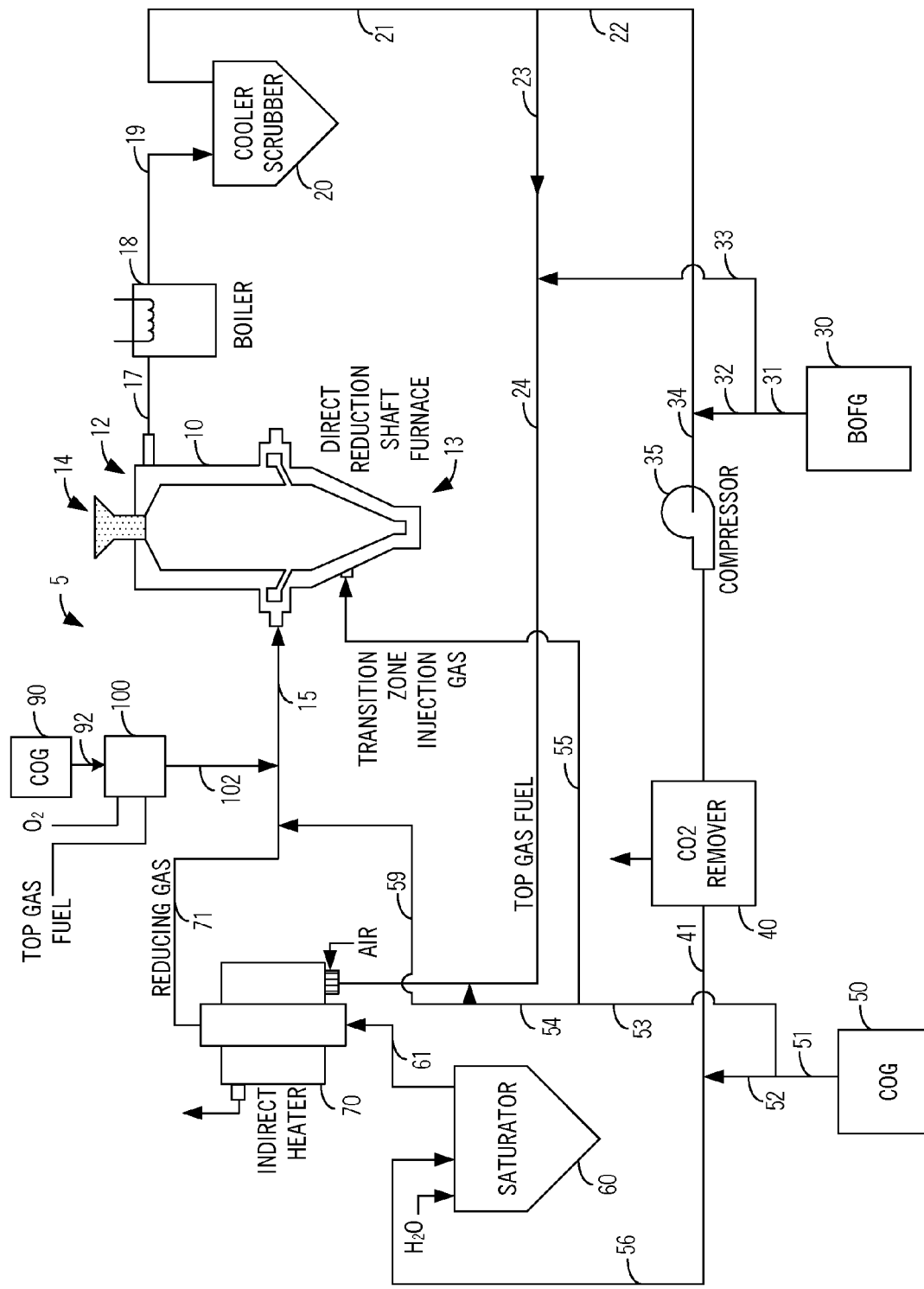
FIG. 3 is a schematic diagram illustrating an alternative exemplary embodiment of the novel system and method for reducing iron oxide to metallic iron using COG of the present invention.

Referring now to FIG. 3, in an alternative exemplary embodiment of the present invention, reformed COG processed in a thermal reactor system 100 is injected 102 into the system/process stream 15 just prior to the direct reduction shaft furnace 10. Preferably, this thermal reactor system 100 provides reformed COG, as indicated previously, or fresh hot COG, and is from a partial oxidation system, such as a hot oxygen burner (which injects COG 90 into an ultra-hot flame), well known to those of ordinary skill in the art. The reformed COG at the thermal reactor system 100 is hot (between about 1000 degrees C. and about 1600 degrees C.) and is injected 102 into the about 900 degrees C. stream 15. Because of this heat, the oxygen 80 injection 81 described previously (see FIG. 1) becomes optional. The result is less oxygen 80 injection 81 into the system/process 5, while still avoiding the development of carbon soot. This COG thermal reactor system 100 injection 102 may be used in place of, or as a complement to, the cooler COG and/or BOFG injection sources and points described previously. For example, the COG thermal reactor system 100 injection 102 may be used in conjunction with a standard Midrex natural gas process with a reformer. As such, the previously described $CO_2$ removal system 40 and indirect heater 70 would not be necessary (the reformer would adequately perform both of these functions).

The reformed COG at the thermal reactor system 100 has the following exemplary contents: 2-13% $CH_4$ (at about 1,500 degrees C.—about 1,200 degrees C., respectively), 18.7% CO, 1.7% $CO_2$, 43.4% $H_2$, 17.7% $H_2O$, 3.6% $N_2$, and 1.8% $C_2H_6$, and possibly 0.9% $C_2H_4$ and 1.7% $C_2H_2$. Of course these contents are exemplary only and should not be construed as limiting in any respect.

Figure 4:
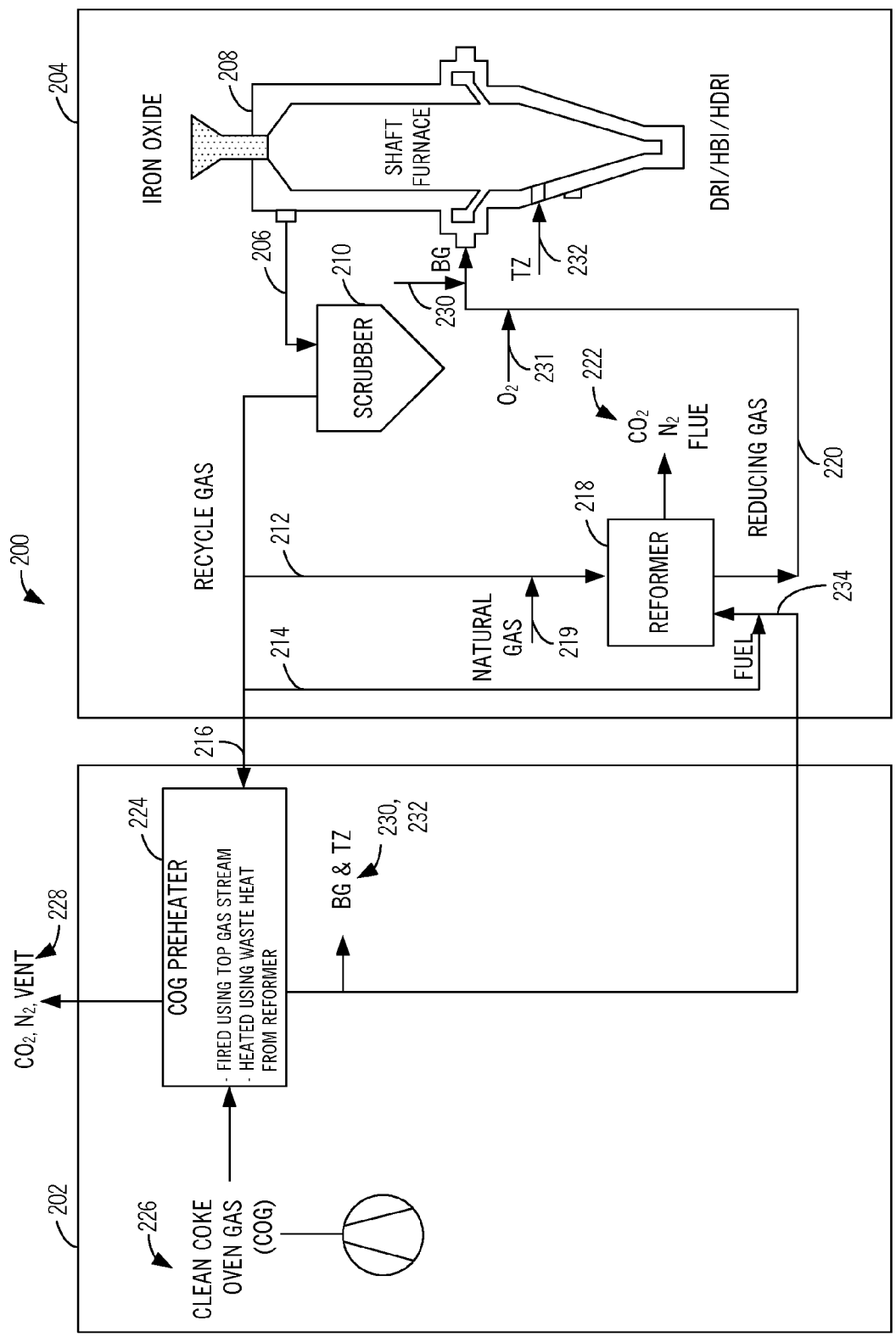
FIG. 4 is another schematic diagram illustrating an alternative exemplary embodiment of the novel system and method for reducing iron oxide to metallic iron using COG of the present invention—specifically, the use of COG is essentially added to an existing direct reduction plant.

FIG. 4 is another schematic diagram illustrating an alternative exemplary embodiment of the novel system and method 200 for reducing iron oxide to metallic iron using COG of the present invention—specifically, the use of COG 202 is essentially added to an existing direct reduction plant 204. This alternative exemplary embodiment can use COG up to about 120 $m^3$/t DRI, and replaces the conventional natural gas used in about a 1.25:1 ratio. Recycled top gas 206 is removed from the shaft furnace 208 and fed to a scrubber 210 for water removal, cooling, and/or cleaning, resulting in a gas saturated at a temperature of between about 30 degrees C. and about 65 degrees C. This recycled top gas 206 is then split into three streams. The first stream 212 is fed to a reformer 218, where it reforms natural gas 219, and is heated to a temperature of between about 900 degrees C. and about 1100 degrees C., thereby providing reducing gas 220 that is fed into the shaft furnace 208. $O_2$ 231 may be added to the reducing gas 220, as necessary, prior to the reducing gas 220 being fed into the shaft furnace 208. Excess $CO_2$ and $N_2$ are removed via the reformer flue 222, for example. The second stream 214 is used as reformer fuel. The third stream 216 is used to fire a COG preheater 224, which may also or alternatively be operated using waste heat from the reformer 218. A supply of compressed clean COG 226 is processed through the COG preheater 224, and preheated to a temperature of between about 300 degrees C. and about 500 degrees C. Both $CO_2$ and $N_2$ 228 are vented, as necessary, through the COG preheater 224. A portion of the compressed clean preheated COG may be delivered to the shaft furnace 208 as bustle gas (BG) 230, a portion of the compressed clean preheated COG may be delivered to the shaft furnace 208 as transition zone (TZ) gas 232, and a portion of the compressed clean preheated COG may be used as reformer fuel 234. The use of COG results in reduced natural gas consumption in the DR process, allows for control of the carbon content of the resulting DRI, and allows for control of the temperature of the bed in the shaft furnace.

Figure 5:
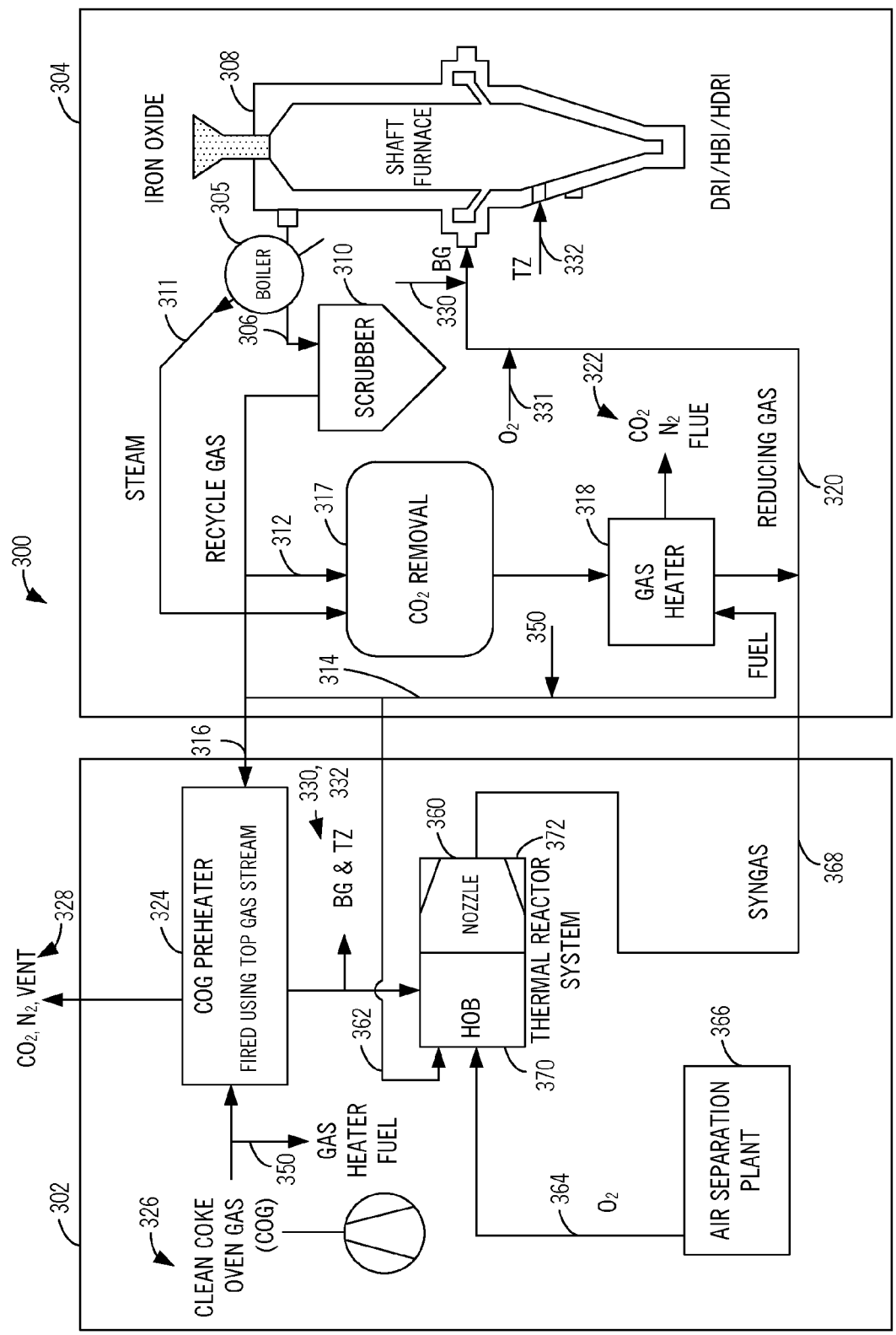
FIG. 5 is a further schematic diagram illustrating an alternative exemplary embodiment of the novel system and method for reducing iron oxide to metallic iron using COG of the present invention—specifically, COG is used in conjunction with a low-carbon (up to about 1-2%) direct reduction plant, such as an HBI plant.

FIG. 5 is a further schematic diagram illustrating an alternative exemplary embodiment of the novel system and method 300 for reducing iron oxide to metallic iron using COG of the present invention—specifically, the use of COG 302 is coupled with a low-carbon (up to about 1-2%) direct reduction plant 304, such as an HBI plant, for example. This alternative exemplary embodiment uses COG up to about 500-600 $m^3$/t DRI. Recycled top gas 306 is removed from the shaft furnace 308 and fed to a boiler 305 and scrubber 310 for water removal, cooling, and/or cleaning, resulting in a gas saturated at a temperature of between about 30 degrees C. and about 45 degrees C. This recycled top gas 306 is then split into at least three streams (and likely four). The first stream 312 is fed to an absorption type $CO_2$ removal unit 317, which removes about 95% of the $CO_2$ from this stream of the recycled top gas 306, and a gas heater 318, which heats this stream of the recycled top gas 306 to a temperature of between about 900 degrees C. and about 1100 degrees C., thereby providing reducing gas 320 that is fed into the shaft furnace 308. $O_2$ 331 may be added to the reducing gas stream 320, as necessary, prior to the reducing gas 320 being fed into the shaft furnace 308. Optionally, the $CO_2$ removal unit 317 is a membrane type $CO_2$ removal unit, a pressure swing adsorption (PSA) unit, a vacuum pressure swing adsorption (VPSA) unit, etc. Steam 311 from the boiler 305 may be used by the $CO_2$ removal unit 317. $CO_2$ and $N_2$ are also removed via the gas heater flue 322, for example. The second stream 314 is used as gas heater fuel. The third stream 316 is again used to fire a COG preheater 324. A supply of compressed clean COG 326 is processed through the COG preheater 324, and preheated to a temperature of between about 300 degrees C. and about 500 degrees C. Both $CO_2$ and $N_2$ 328 are vented, as necessary, through the COG preheater 324. Prior to preheating, a portion of the compressed clean COG 326 may be used as gas heater fuel 350. Again, a portion of the compressed clean preheated COG may be delivered to the shaft furnace 308 as BG 330 and a portion of the compressed clean preheated COG may be delivered to the shaft furnace 308 as TZ gas 332. The remainder of the compressed clean preheated COG is processed by a thermal reactor system (TRS) 360 to form syngas 368 that is added to the previously mentioned reducing gas stream 320. Preferably, the syngas 368 consists of at least about 82% $H_2$ and CO. In general, the TRS 360 includes a hot oxygen burner (HOB) 370 and a nozzle 372. Fuel 362 derived from the recycled top gas 306 (in a fourth stream, for example) is combined with O₂ 364 from an air separation plant 366 or the like in the HOB 370 and, at high temperature (i.e. 2,000-2,500 degrees C.), is accelerated through the nozzle 372 and contacted with the compressed clean preheated COG to form the syngas 368. The use of COG in the bustle gas and the transition zone gas allows for control of the carbon content of the resulting DRI, and allows for control of the temperature of the bed in the shaft furnace.

Figure 6:
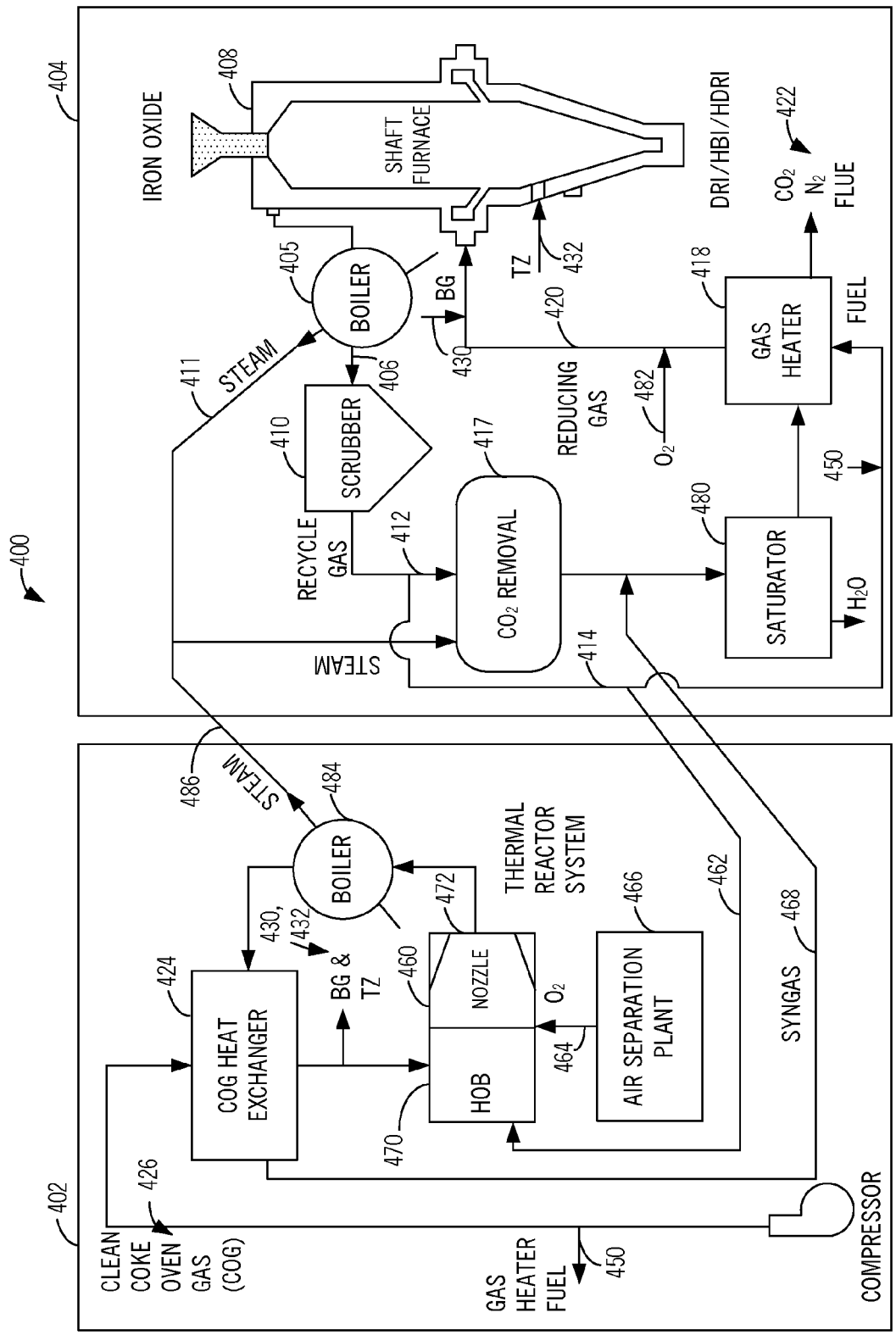
FIG. 6 is a further schematic diagram illustrating an alternative exemplary embodiment of the novel system and method for reducing iron oxide to metallic iron using COG of the present invention—specifically, COG is used in conjunction with a high-carbon (greater than about 2%) direct reduction plant.

FIG. 6 is a further schematic diagram illustrating an alternative exemplary embodiment of the novel system and method 400 for reducing iron oxide to metallic iron using COG of the present invention—specifically, the use of COG 402 is coupled with a high-carbon (greater than about 2%) direct reduction plant 404, for example. Recycled top gas 406 is removed from the shaft furnace 408 and fed to a boiler 405 and scrubber 410 for water removal, cooling, and/or cleaning, resulting in a gas saturated at a temperature of between about 30 degrees C. and about 45 degrees C. This recycled top gas 406 is then split into at least three streams. The first stream 412 is fed to a CO₂ removal unit 417, which removes about 95% of the CO₂ from this stream of the recycled top gas 406, a saturator 480, which removes H₂O from this stream of the recycled top gas 406, and a gas heater 418, which heats this stream of the recycled top gas 406 to a temperature of between about 900 degrees C. and about 1100 degrees C., thereby providing reducing gas 420 that is fed back into the shaft furnace 408. Optionally, the CO₂ removal unit 417 is a membrane type CO₂ removal unit, a PSA unit, a VPSA unit, etc. Steam 411 from the boiler 405 may be used by the CO₂ removal unit 417. CO₂ and N₂ are also removed via the gas heater flue 422, for example. The second stream 414 is used as gas heater fuel. A supply of compressed clean COG 426 is processed through a COG heat exchanger 424, and preheated to a temperature of between about 300 degrees C. and about 500 degrees C. Optionally, the COG heat exchanger 424 operates by cross-exchange with a still heated syngas 468, as described in greater detail below. Prior to preheating, a portion of the compressed clean COG 426 may be used as gas heater fuel 450. Again, a portion of the compressed clean preheated COG may be delivered to the shaft furnace 408 as BG 430 and a portion of the compressed clean preheated COG may be delivered to the shaft furnace 408 as TZ gas 432. Again, the remainder of the compressed clean preheated COG is processed by a TRS 460 to form the still heated syngas 468. Preferably, the syngas 468 consists of at least about 82% H₂ and CO and is generated by the TRS 460 and a recycle loop including the TRS 460, a boiler 484 (which also generates steam 486 for use in the CO₂ removal unit 417), and the COG heat exchanger 424, which cools the preheated and reacted COG stream to form the syngas 468. In general, the TRS 460 includes an HOB 470 and a nozzle 472. Fuel 462 derived from the recycled top gas 406 is combined with O₂ 464 from an air separation plant 466 or the like in the HOB 470 and, at high temperature (i.e. 2,000-2,500 degrees C.), is accelerated through the nozzle 472 and contacted with the compressed clean preheated COG to form the syngas 468. The syngas 468 is preferably combined with the reducing gas stream 420 between the CO₂ removal unit 417 and the saturator 480. O₂ 482 may be added to the reducing gas 420 prior to injection into the shaft furnace 408. In this embodiment, given the higher carbon content involved, less H₂O is desirable in order to have the proper ratio of reducing gases to oxidizing gases. Thus, the approximately 1,200-degree C. temperature leaving the TRS 460 is reduced to approximately 400-600 degrees C. by the boiler 484, which is reduced to approximately 200 degrees C. by the COG heat exchanger 424. The saturator 480 then takes the approximately 12%-H₂O syngas 468 and, when combined with the recycled top gas 406, reduces the moisture content to approximately 2-6%. Again, the use of COG in the bustle gas and the transition zone gas allows for control of the carbon content of the resulting DRI, and allows for control of the temperature of the bed in the shaft furnace.

Figure 7:
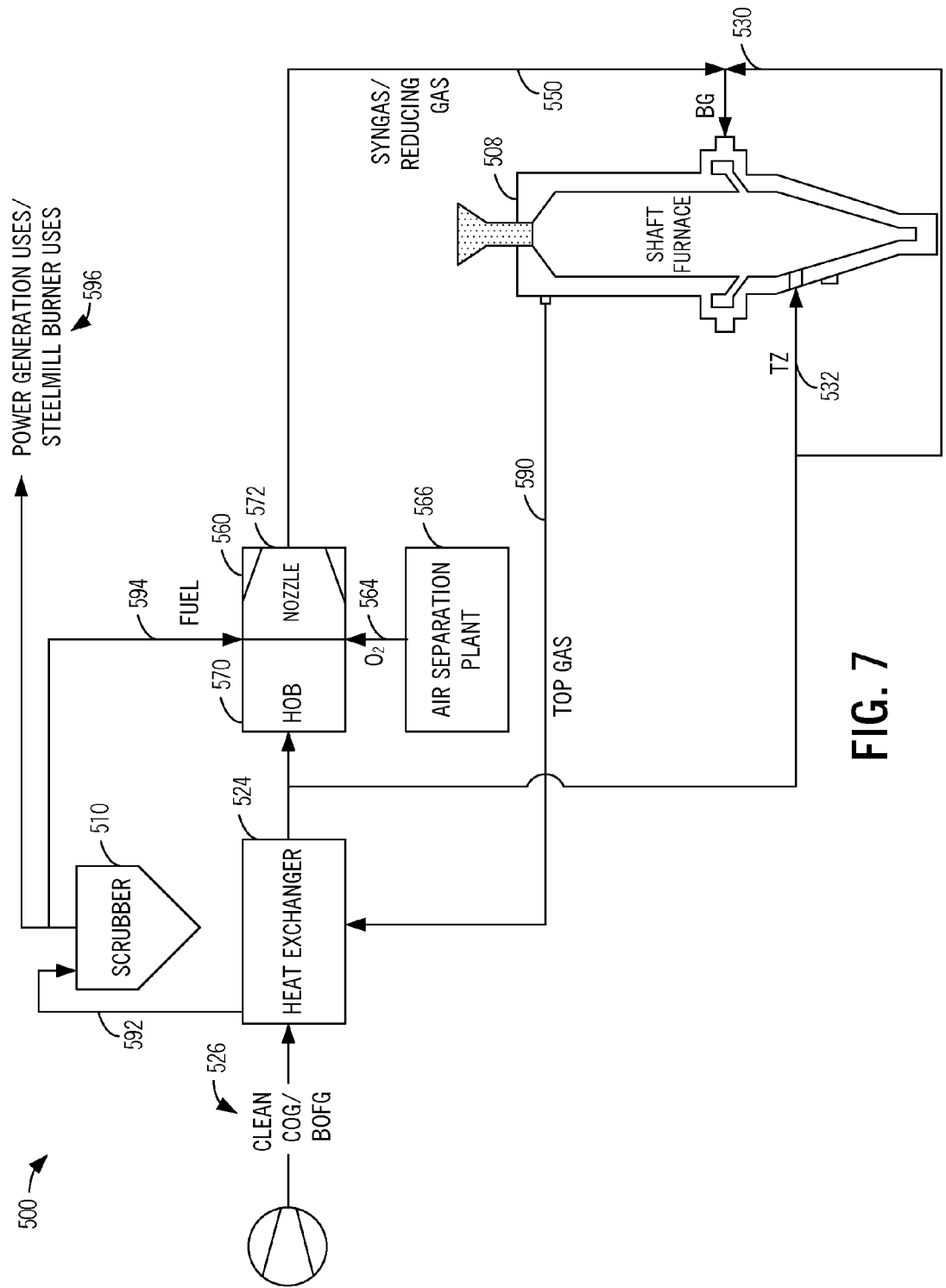
FIG. 7 is a schematic diagram illustrating an alternative exemplary embodiment of a novel once through (i.e. no recycle) system and method for reducing iron oxide to metallic iron using COG or COG and BOFG of the present invention.

FIG. 7 is a schematic diagram illustrating an alternative exemplary embodiment of a novel once through (i.e. no recycle) system and method 500 for reducing iron oxide to metallic iron using COG or COG and BOFG of the present invention. This alternative exemplary embodiment allows COG or COG and BOFG to be used to both produce metallic iron and generate power, as well as in a steelmaking facility, in applications where such multi-functionality desired. A supply of compressed clean COG or COG and BOFG 526 is processed through a heat exchanger 524, and heated to a temperature of between about 300 degrees C. and about 500 degrees C. A spent top gas stream 590/592 is cooled and/or cleaned in the heat exchanger 524 and a scrubber 510 and the resulting gas stream may be used as fuel 594 for a TRS 560 or the like and/or for power generation/steelmill burners 596. Again, a portion of the compressed clean preheated COG or COG and BOFG may be delivered to the shaft furnace 508 as BG 530 and a portion of the compressed clean preheated COG or COG and BOFG may be delivered to the shaft furnace 508 as TZ gas 532. The remainder of the compressed clean preheated COG or COG and BOFG is processed by the TRS 560 to form syngas/reducing gas 550. Preferably, the syngas/reducing gas 550 consists of reductant-to-oxidant ratio of about 5-to-6. In general, the TRS 560 includes an HOB 570 and a nozzle 572. Fuel 594 derived from the heat exchanger 524, for example, is combined with O₂ 564 from an air separation plant 566 or the like in the HOB 570 and, at high temperature (i.e. 2,000-2,500 degrees C.), is accelerated through the nozzle 572 and contacted with the compressed clean preheated COG or COG and BOFG to form the syngas/reducing gas 550. Again, the use of COG in the bustle gas and the transition zone gas allows for control of the carbon content of the resulting DRI, and allows for control of the temperature of the bed in the shaft furnace.

It should be understood that, in addition to (i.e. in place of) the COG and BOFG discussed herein above, the systems and methods of the present invention may also be used in conjunction with other gaseous hydrocarbons, liquid hydrocarbons (e.g. naphtha, diesel fuel), solid hydrocarbons, propane, biomass, and the like. Such alternative modes of operation are contemplated herein.

Although the present invention has been illustrated and described herein with reference to preferred embodiments and specific examples thereof, it will be readily apparent to those of ordinary skill in the art that combinations of these embodiments and examples and other embodiments and examples may perform similar functions and/or achieve like results. All such equivalent embodiments and examples are within the spirit and scope of the present invention, are contemplated thereby, and are intended to be covered by the following claims.

What is claimed is:

1. A method for reducing iron oxide to metallic iron using coke oven gas (COG), comprising:

providing a top gas stream from a direct reduction shaft furnace;

reforming natural gas with the top gas stream in a reformer to form a reducing gas stream and providing the reducing gas stream to the direct reduction shaft furnace to reduce the iron oxide to the metallic iron;

providing a COG stream to the reformer as fuel;

preheating the COG stream in a preheater prior to providing the COG stream to the reformer as fuel; and
one or more of: venting one or more of carbon dioxide and nitrogen from the reformer and venting one or more of carbon dioxide and nitrogen through the preheater.

2. The method of claim 1, further comprising providing a portion of the preheated COG stream to the direct reduction shaft furnace as one or more of bustle gas and transition zone gas.

3. The method of claim 2, further comprising adding oxygen to the bustle gas.

4. The method of claim 1, further comprising firing the preheater with a portion of the top gas stream.

5. The method of claim 1, further comprising preheating the COG stream in the preheater using waste heat from the reformer.

6. A method for reducing iron oxide to metallic iron using coke oven gas (COG), comprising:
providing a top gas stream from a direct reduction shaft furnace;
removing carbon dioxide from the top gas stream using a carbon dioxide removal unit;
heating the top gas stream in a gas heater to form a reducing gas stream and providing the reducing gas stream to the direct reduction shaft furnace to reduce the iron oxide to the metallic iron; and
adding a COG stream to the reducing gas stream as a synthesis gas stream.

7. The method of claim 6, further comprising preheating the COG stream in a preheater prior to adding the COG stream to the reducing gas stream as the synthesis gas stream.

8. The method of claim 7, further comprising reacting the preheated COG stream in a thermal reactor system to form the synthesis gas stream.

9. The method of claim 8, wherein the thermal reactor system comprises an oxygen burner and a nozzle that utilize oxygen and a fuel.

10. The method of claim 9, wherein the oxygen is received from an air separation plant.

11. The method of claim 9, wherein the fuel comprises a portion of the top gas stream.

12. The method of claim 7, further comprising firing the preheater with a portion of the top gas stream.

13. The method of claim 7, further comprising providing a portion of the preheated COG stream to the direct reduction shaft furnace as one or more of bustle gas and transition zone gas.

14. The method of claim 13, further comprising adding oxygen to the bustle gas.

15. The method of claim 6, further comprising providing a portion of the COG stream to the gas heater as fuel.

16. The method of claim 6, further comprising generating steam in a boiler using the top gas stream and utilizing the steam in the carbon dioxide removal unit.

17. The method of claim 6, further comprising providing a portion of the top gas stream to the gas heater as fuel.

18. A method for reducing iron oxide to metallic iron using coke oven gas (COG), comprising:
providing a top gas stream from a direct reduction shaft furnace;
removing carbon dioxide from the top gas stream using a carbon dioxide removal unit to form a carbon dioxide lean gas stream;
adding a COG synthesis gas stream to the carbon dioxide lean gas stream to form a combined gas stream;
removing moisture from the combined gas stream using a saturator to form a moisture controlled combined gas stream; and
heating the moisture controlled combined gas stream in a gas heater to form a reducing gas stream and providing the reducing gas stream to the direct reduction shaft furnace to reduce the iron oxide to the metallic iron.

19. The method of claim 18, further comprising preheating a COG stream in a heat exchanger.

20. The method of claim 19, further comprising reacting the preheated COG stream in a thermal reactor system to form the COG synthesis gas stream.

21. The method of claim 20, wherein the thermal reactor system comprises an oxygen burner and a nozzle that utilize oxygen and a fuel.

22. The method of claim 21, wherein the oxygen is received from an air separation plant.

23. The method of claim 21, wherein the fuel comprises a portion of the top gas stream.

24. The method of claim 20, further comprising cooling the preheated and reacted COG stream in a boiler and the heat exchanger to form the COG synthesis gas stream.

25. The method of claim 20, further comprising generating steam in a second boiler using the preheated and reacted COG stream and utilizing the steam in the carbon dioxide removal unit.

26. The method of claim 19, further comprising providing a portion of the COG stream to the gas heater as fuel.

27. The method of claim 19, wherein the heat exchanger operates by cross-exchange with the preheated COG synthesis gas stream.

28. The method of claim 19, further comprising providing a portion of the preheated COG stream to the direct reduction shaft furnace as one or more of bustle gas and transition zone gas.

29. The method of claim 18, further comprising generating steam in a first boiler using the top gas stream and utilizing the steam in the carbon dioxide removal unit.

30. The method of claim 18, further comprising providing a portion of the top gas stream to the gas heater as fuel.

31. The method of claim 18, further comprising adding oxygen to the reducing gas stream.

32. A method for reducing iron oxide to metallic iron using coke oven gas (COG) or COG and basic oxygen furnace gas (BOFG), comprising:
providing a COG or COG and BOFG stream;
preheating the COG or COG and BOFG stream in a heat exchanger;
reacting the preheated COG or COG and BOFG stream in a thermal reactor system to form a reducing gas stream;
providing the reducing gas stream to a direct reduction shaft furnace to reduce the iron oxide to the metallic iron; and
providing a portion of the preheated COG or COG and BOFG stream to the direct reduction shaft furnace as one or more of bustle gas and transition zone gas.

33. The method of claim 32, wherein the thermal reactor system comprises an oxygen burner and a nozzle that utilize oxygen and a fuel.

34. The method of claim 33, wherein the oxygen is received from an air separation plant.

35. The method of claim 33, wherein the fuel comprises a portion of a top gas stream derived from the direct reduction shaft furnace that is cooled in the heat exchanger and cleaned in a scrubber.

36. The method of claim 35, wherein the COG or COG and BOFG stream is preheated in the heat exchanger by cross-exchange with the top gas stream.

37. The method of claim 35, further comprising utilizing a remaining portion of the cooled/cleaned top gas stream in one or more of a power generation system and a steelmaking facility.

* * * * *